United States Patent [19]

Franson et al.

[11] 4,079,744
[45] Mar. 21, 1978

[54] DRAIN VALVE

[75] Inventors: David Craig Franson; Duane David Gilger, both of Kalamazoo, Mich.

[73] Assignee: Parker-Hannifin Corporation, Cleveland, Ohio

[21] Appl. No.: 707,367

[22] Filed: Jul. 21, 1976

[51] Int. Cl.² .............................................. F16T 1/00
[52] U.S. Cl. .................................... 137/203; 251/342; 251/350
[58] Field of Search ................ 137/205; 251/350, 342; 222/402.22, 402.23, 394

[56] References Cited

U.S. PATENT DOCUMENTS

| 1,944,770 | 1/1934 | Svorcina | 137/533.29 X |
| 2,597,483 | 5/1952 | Head | 137/533.29 |
| 2,769,454 | 11/1956 | Bletcher | 252/358 X |
| 2,869,764 | 1/1959 | Collins | 222/402.23 |
| 2,886,284 | 5/1959 | Wheatley | 251/358 |
| 3,108,721 | 10/1963 | Nebinger | 251/350 X |
| 3,450,146 | 6/1969 | Edwards | 137/203 |
| 3,722,760 | 3/1973 | Hug | 222/402.22 |
| 3,758,007 | 9/1973 | Rosen | 222/394 |

Primary Examiner—Alan Cohan
Attorney, Agent, or Firm—John N. Wolfram

[57] ABSTRACT

This invention relates to a drain valve and is particularly adapted for draining water or other liquid from the bowl of a filter for pneumatic systems. The valve includes a bendable tubular body of flexible material and there is a poppet for normally closing a drain passage through the body. The valve has a stem in the passage which is deflectable by manual bending of the body to unseat the valve for opening the drain passage. There is a means for holding the valve seated when the body is not bent, and a portion of the passage constantly bypasses such means to permit drainage flow when the valve is unseated, regardless of whether there is pressure in the bowl.

7 Claims, 5 Drawing Figures

U.S. Patent  March 21, 1978  4,079,744
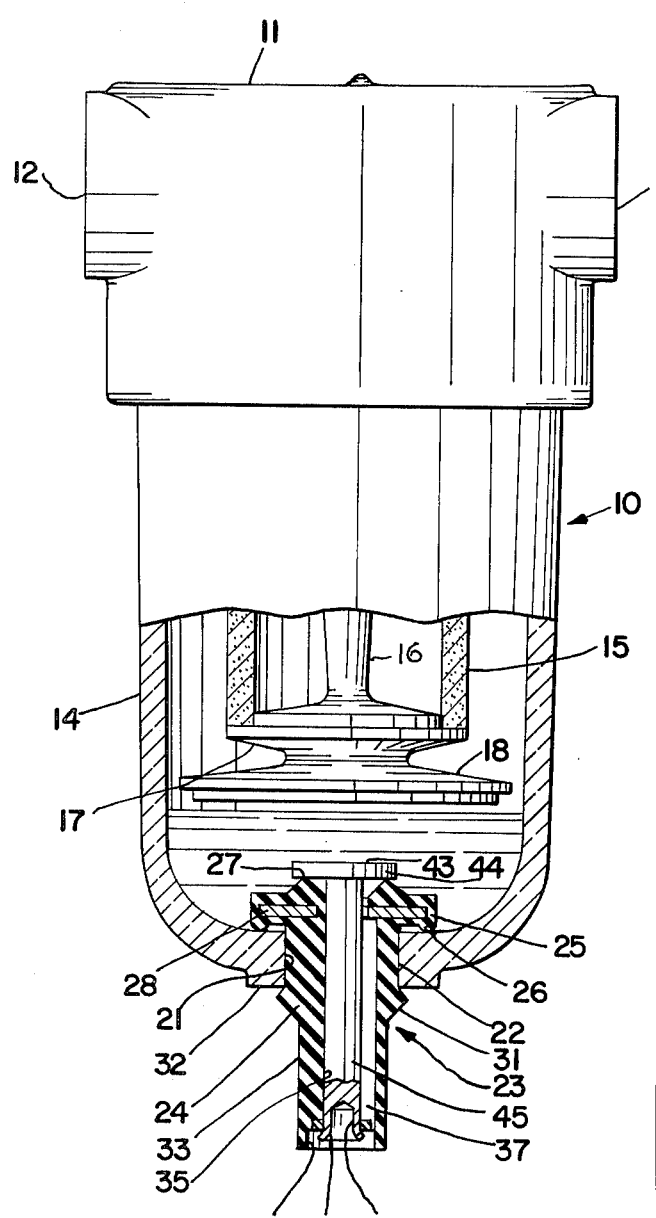
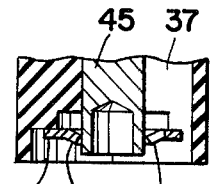
Fig. 5
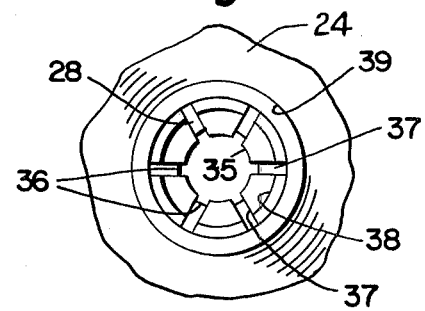
Fig. 4
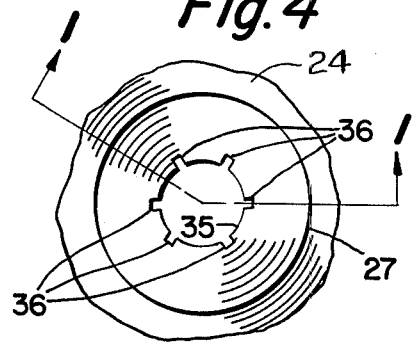
Fig. 3
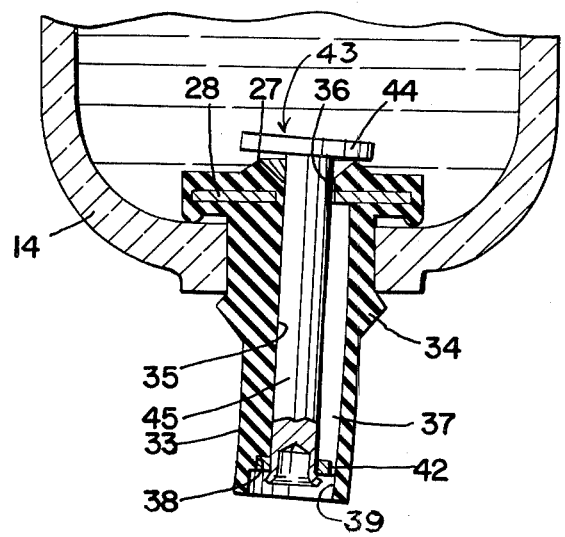
Fig. 1
Fig. 2

DRAIN VALVE

BACKGROUND OF THE INVENTION

In compressed air systems it is common practice to pass the pressurized air through a filter before it is delivered to an air motor or other place of use. The filter not only removes solid impurities but will also collect water or other liquids entrained in the compressed air. This water or other liquid must be periodically drained from the filter bowl.

To remove the liquid, the filter bowls are frequently provided with a normally closed manually operated drain valve. In one prior form of such drain valve for a filter bowl as shown in U.S. Pat. No. 3,450,146, the valve body is of flexible material and has a tubular extension below the bowl that may be manually bent for tilting a valve element for unseating the latter. However, the valve stem carries a secondary seal that only opens when the system is pressurized and the body is manually bent. Thus, the bowl cannot be readily drained when it is not under pressure.

SUMMARY OF THE INVENTION

The present invention provides a drain valve particularly adaptable for draining liquid condensate from the filter bowls of compressed air systems. The valve body is of flexible material and has a tubular extension that may be bent for tilting a valve element for opening a drain passage through the valve body. The valve element has a head and a stem and there is a means associated with the stem and body that normally imposes a seating force on the valve head when the body is not bent. The drain passage includes a groove that bypasses such means in both the bent and unbent position of the body. As a consequence, liquid leaking past the valve seat when the body is not manually bent will serve as an indicator that the valve is leaking and may require repair or replacement. Also, the valve may be operated by manual bending while the bowl is either pressurized or not pressurized for draining the liquid therefrom.

DETAIL DESCRIPTION

FIG. 1 is a longitudinal cross section of an airline filter in which the drain valve is mounted, and with the drain valve sectioned along the lines 1—1 of FIG. 3.

FIG. 2 is a cross section view through the drain valve corresponding to the view of FIG. 1 but with the valve manually bent for opening the same.

FIG. 3 is a fragmentary enlarged view of the inner end of the drain valve body.

FIG. 4 is a fragmentary enlarged view of the outer end of the drain valve body.

FIG. 5 is a fragmentary section view of a modified form of the invention.

A typical airline filter 10 has a body 11 with an inlet port 12 and an outlet port 13. The body is connected to a filter bowl 14 and there is a cylindrical filter element 15 attached to body 11 by stud 16 having thereon a closure plate 17 and baffle 18.

Mounted in an opening 21 in the bottom of filter bowl 14 is a drain valve 23. The drain valve has a body 24 of a resilient and flexible material, such as synthetic rubber. The inner portion of the valve body has a cylindrical portion 22 of slightly larger initial diameter than opening 21 so as to be diametrically squeezed thereby to seal the opening. The valve body 24 includes a radially extending flange 25 that has a raised annular rib 26 on one side thereof for making sealed engagement with the bottom of bowl 14 and which has an annular sharp edge valve seat 27 on its other side. A washer 28 of rigid material is embedded within flange 25 and extends axially between and axially opposite rib 26 and seat 27. Body 24 includes a circular rib 31 of larger diameter than bowl opening 21 and which is yieldable to permit insertion through opening 21 so that valve body 24 may be assembled to the bowl from the inside of the latter. Rib 31 may engage the bottom face 32 of the bowl to retain the valve body on the bowl and if desired may be positioned to constantly impose a seating force on rib 26 against the bottom inside wall of the bowl, although this is not necessary because the diametral squeeze on body cylindrical portion 22 is sufficient to hold the valve body in proper axial position with the rib 25 in sealing engagement with the bowl under conditions of little or no pressure in the bowl. When there is pressure in the bowl it will assist in holding rib 26 seated. Rib 31 will normally prevent or restrict upward movement of valve body 24 through opening 21 but will yield when sufficient force is applied to permit valve body 24 to be removed from the bowl by upward movement.

The outer portion of body 24 has a cylindrical outer surface 33. The body also has a passage therethrough that includes a cylindrical bore 35 with circumferentially spaced axially extending slots 36, 37 communicating therewith and with each other. The slots 36 are of shallow depth at the inner end of valve body 24 adjacent and above washer 28, as illustrated in FIG. 3. Slots 37 are of greater depth so that they extend radially outwardly of counterbores 38 and 39 at the outer end of body 24. A washer 42 is mounted within counterbore 38.

A valve element 43 has a head 44 engageable with seat 27 for closing the valve passages 35, 36 and 37 and has a cylindrical stem 45 that is a close sliding fit within bore 35. The lower or outer end of the stem has a recess 46 to form a thin tubular section 47 that is outwardly flared so as to axially abut washer 42. The positioning of flare or abutment 47 is such that in the normal or unbent position of the valve, head 44 presses against seat 27 to establish a seal even when there is little or no pressure within bowl 14.

When the drain valve is to be operated, the lower or outer end 33 of the flexible body 34 is manually bent to a position as shown in FIG. 2. In this position, the bottom or lower end of stem 45 is deflected sidewards so as to tilt head 44 so as to disengage the latter from a portion of valve seat 27. This permits liquid from bowl 14 to flow past seat 27 into slots 36 and 37 and counterbore 39 to the exterior of the valve body. When the lower end of the valve body is released, it returns by its own elasticity to the position shown in FIG. 1 wherein head 44 is again fully seated on valve seat 27 to seal the drain passages.

Because the drain slots 36, 37 are always open to counterbore 39 the valve may be operated for draining the bowl regardless of whether the bowl is pressurized by compressed air.

In the modification shown in FIG. 5, valve stem 45 is not flared as at 47 of FIG. 1 for retaining head 44 in light sealing contact with seat 27. Instead, a retaining washer 51 is utilized that has a series of circumferentially spaced fingers 52 that grip stem 45. Between fingers 52 are slits 53 that permit flow of fluid from slots 37 to the exterior of valve body 24. In this version washer 42 is omitted.

In another modification, not shown, washer 42 may be omitted and flare 47 may be formed so as to engage the bottom of counterbore 38 for lightly holding valve head 44 against seat 27.

Although the drain valve has been described for use in connection with filter bowls for pneumatic systems, it may be used for draining bowls for lubricators as well as for other containers to be drained.

We claim:

1. A drain valve for a container having an opening, said valve comprising a generally tubular body of flexible material having a passage therethrough, said body having an inner end with portions to be received in said opening in sealed contact with said container, said body having a manually bendable outer end to project from said opening, said inner end having a valve seat, a valve element having a head engaged with said seat for closing said passage and having a stem in said passage, said passage including a first counterbore at the outer end of said passage, a washer fitted into said counterbore, said passage outwardly of said counterbore being of no less diameter than said counterbore whereby said washer may be readily inserted into said counterbore from the outer end of said passage, said stem having a portion laterally overlying an outer face of said washer for retaining the washer on said stem and whereby the washer restricts inward movement of the valve member relative to the body, said stem being tiltable by the outer end of the body upon bending of the latter whereby the head is at least partially disengaged from said seat to permit flow of fluid through said passage, and said passage having a portion that constantly bypasses said stem and washer to thereby at all times connect the inner end of the passage with the exterior of the body at the outer end of the latter.

2. The valve of claim 1 in which said passage comprises a cylinder bore having a slide fit with said stem and a longitudinal slot radially outwardly of the bore that is open to the bore, said slot extending radially outwardly beyond said washer to provide a flow path past the washer.

3. The valve of claim 2 in which there is a second counterbore axially outwardly of and of greater diameter than the first counterbore, and said slot constantly communicates with said second counterbore past said washer.

4. A drain valve for a container having an opening, said valve comprising a generally tubular body of flexible material having a passage therethrough, said body having an inner end with portions to be received in said opening in sealed contact with said container, said body having a manually bendable outer end to project said opening, said inner end having a valve seat, a valve element having a head engaged with said seat for closing said passage and having a stem in said passage, means for restricting inward movement of the valve element relative to said body, said stem being tiltable by the outer end of the body upon bending of the latter whereby the head is at least partially disengaged from said seat to permit flow of fluid through said passage, said passage having a portion that constantly bypasses said stem and said means to thereby at all times connect the inner end of the passage with the exterior of the body, said body at its inner end having a radially extending flange sealingly engageable with said container, said passage comprising a cylinder bore having a slide fit with said stem and a longitudinal slot radially outwardly of the bore that is open to the bore, said slot at its axially inner end having a first portion extending a first radial distance from the longitudinal centerline of said bore a lesser distance than a second portion of the slot axially outwardly of the first portion, a rigid washer embedded in said body between said first and second slot portions, and said washer having a central opening therethrough of a radius substantially the same as said first radial distance whereby a portion of said washer transversely overlies part of said second slot portion.

5. In combination, a container for fluid and a drain valve, said container having an opening through a bottom wall thereof, said valve having a body of resilient bendable material and a valve element of relatively rigid material, said body having an inner end extending through said opening and having on its upper side an annular valve seat, said body having an outer end projecting below said bottom wall, passage means through said body and open at its inner end to said seat, said passage means at all times open at its outer end to the exterior of the body, said valve element having a head at its inner end engageable with said seat for closing said passage means, said element having a stem extending into said body, means for normally holding the valve head in engagement with said seat, said body outer portion being manually bendable to move the outer end of the stem sidewards against the stem whereby the head will be tilted and at least partially disengaged from said seat to open the interior of the container to the exterior of said body via said passage means, said passage means including a bore in which said stem is mounted and also including a slot that extends radially outwardly of the bore, said slot having an upper portion of less radial depth than a lower portion thereof.

6. The combination of claim 5 in which said body inner end includes a flange overlying an inside face of the container and said valve body has a circular rib engaging an outside face of the container to constantly impose a seating force on said flange against said inside face, said rib having an inclined face adjacent the container and in engagement therewith.

7. The combination of claim 6 in which said opening is of uniform diameter throughout, said valve body inner end includes a cylindrical portion of initial uniform diameter that is greater than the diameter of said opening and which is diametrally squeezed therein to seal the opening.

* * * * *